(12) United States Patent
Zettl

(10) Patent No.: US 7,934,340 B2
(45) Date of Patent: May 3, 2011

(54) METHOD AND APPARATUS FOR THE SCHEDULED PRODUCTION OF PLANT EXTRACTS

(75) Inventor: Brent Zettl, Saskatoon (CA)

(73) Assignee: Praire Plant Systems, Saskatoon (CA)

( * ) Notice: Subject to any disclaimer, the term of this patent is extended or adjusted under 35 U.S.C. 154(b) by 139 days.

(21) Appl. No.: 12/137,786

(22) Filed: Jun. 12, 2008

(65) Prior Publication Data

US 2008/0243537 A1 Oct. 2, 2008

Related U.S. Application Data

(62) Division of application No. 11/070,964, filed on Mar. 3, 2005, now abandoned.

(51) Int. Cl.
 *A01B 79/00* (2006.01)
 *A01B 79/02* (2006.01)
 *A01C 1/00* (2006.01)
 *A01G 1/00* (2006.01)
 *A01H 3/00* (2006.01)
(52) U.S. Cl. .................................. 47/58.1 R; 47/1.01 R
(58) Field of Classification Search ................. 47/17, 58, 47/58.1 R, 1.01 R; 52/66; 424/401
See application file for complete search history.

(56) References Cited

U.S. PATENT DOCUMENTS

| 4,321,775 A | * | 3/1982 | Emerson | 52/66 |
| 5,209,012 A | * | 5/1993 | Palmer | 47/17 |
| 7,135,616 B2 | | 11/2006 | Heard et al. | |
| 2005/0004682 A1 | | 1/2005 | Gaddis et al. | |

FOREIGN PATENT DOCUMENTS

CA 2498424 A1 4/2004

OTHER PUBLICATIONS

LubbockOnline (Lubbock Avalanche—Journal), "Anti-cancer tobacco plants thrive in mine", Jul. 21, 2000.
Webster's Dictionary, pp. 247 & 551/, 1994.
International Preliminary Report on Patentability, Sep. 11, 2007

* cited by examiner

*Primary Examiner* — Kent L Bell
(74) *Attorney, Agent, or Firm* — Adams Law Group of Oliff & Berridge

(57) ABSTRACT

A method for the just-in-time delivery of harvested plant material and plant compounds grown in a genetically-isolated growth environment is provided. The desired crop is grown in an underground growth chamber according to a predetermined growing model in which all growing conditions are controlled. Component yield and completion time can be accurately forecast such that the harvest time of the plant material, or the completion of upstream plant extract recovery, can be accurately forecast. The use of an underground growth chamber allows for complete control over environmental factors in growth of the plant material, and also allows for the best possible protection of the growing environment against any contamination of genetic material from outside of the chamber, as well as protection of the outdoor environment against any contamination of genetic material from inside of the chamber. The method will be particularly useful in the production of plant-made pharmaceuticals and nutraceutical.

6 Claims, 4 Drawing Sheets

METHOD AND APPARATUS FOR THE SCHEDULED PRODUCTION OF PLANT EXTRACTS

CROSS REFERENCE TO RELATED APPLICATIONS

This application is a divisional of U.S. patent application Ser. No. 11/070,964 filed Mar. 3, 2005.

BACKGROUND

The invention relates to the production of harvested plant material in a genetically contained growth environment. More specifically there is disclosed a method for the just-in-time production of harvested plant material, or plant compounds recovered or obtained from harvested plant material.

The advent of just-in-time manufacturing, procurement and purchasing has reached through many corners of the current market. In accordance with this type of business model, increased business efficiency is realized, which corresponds to a significant economic benefit. Companies or individuals who utilize this methodology are no longer required to hold large inventories of produced materials for long periods of time in order to guarantee timely delivery, since they are able to produce the required products in a predictable amount of time.

One area of the economy in which just-in-time manufacture and delivery of products, intermediates, or inputs is that of the nutraceutical or pharmaceutical industries and their inclusion of various plant compounds in products to be produced. The pharmaceutical and nutraceutical industries currently use many different types of plant compounds in different products that they produce, and it would be beneficial if they could practice the same type of scheduled delivery or just-in-time inventory provisioning as has become the norm in, for example, the auto manufacturing industry or any number of other manufacturing areas. The plant compounds used by these nutraceutical or pharmaceutical companies could be any one of any quantity of different types of compounds or constituents recovered in different ways from harvested plant material. Plant made pharmaceuticals (PMPs) is one area in which the problem of delivery scheduling could be addressed, and plants can even be used effectively as a production systems for various monoclonal antibodies or the like—again the ability to conduct scheduled production of the plant material required from which such antibodies can be recovered would be a major advantage over the current state of the PMP and pharmaceutical industries.

One of the problems to date in terms of being able to practice any type of a tight inventory or purchasing provisioning scheme with respect to these products has been the variance of the actual growth and harvest of the plant material, known as the plant platform, which is required to product the various compounds. There is simply not sufficient predictability in the field growth of crops, for example, to be able to guarantee a time when a certain quantity of a harvested crop material of a certain type will be available. Nor is there a guarantee that the harvested crop material of the said certain type, will be of sufficient quality, as the yield of the pharmaceutical/nutraceutical extracts produced within the plant platform is a function of the growth environment. For example, if a crop is being grown in a field and a number of weeks of dark or cold weather occur during the growth period of the plant platforms, the harvesting of the crop will not only be delayed by a significant time, in the worst case scenario, the yield and quality of the produced plant extract will be lower than predicted. As such the grower of the crop, in addition to being late on delivery, will also be unable to deliver a sufficient yield of product of a sufficient quantity or quality to meet the requirements of the customer. If there was a way to produce the necessary crop material and remove the vagaries of weather conditions from the equation, this could assist in the optimization and production of harvested plant material for use in the creation of plant compounds.

A second issue in the growth or production of plant material for use in PMP or nutraceutical applications products is that the plant material must be produced in a genetically pure environment, i.e. it is desirable to be able to the greatest extent possible to limit or eliminate the amount if any of genetic material entering the growth chamber from the outside world. The need to avoid contamination of the growing area with outside genetic material is another area in which significant enhancements or improvements need to be made in order to secure the production of non-contaminated plant material, which has not been exposed to any such foreign matter during its growth cycle. As well environmental concerns dictate that genetic material within the growth chamber must be contained or be isolated from the natural world, as these plant platforms are often genetically modified, and are unfit for animal or human consumption.

One approach currently practiced that partially addresses some of these identified problems, is the growth and harvesting of plant platforms bearing the required plant material in a greenhouse. However, even a greenhouse has limitations in its utility in this role. Economically speaking, greenhouses are expensive to operate, especially when considering costs due to heating/cooling and lighting, particularly in climates that have dramatic seasonal ranges of ambient temperature and sunlight. It is well known that there is some control of the growing conditions inside of the greenhouse, i.e. temperature, light and relative humidity are typically controlled finitely through the use of heating ventilation air conditioning (HVAC) units, sodium vapor lights, and humidifiers/dehumidifiers, respectively. However, the said control of the growing conditions is not perfect, as the HVAC and lighting equipment are incapable to infinitely handle large variances of temperature, light and relative humidity associated with the outdoor environment and climate. There also remains significant possibility of genetic contamination of the growing environment in an above-ground greenhouse environment from the outdoor environment, and vice versa.

The genetic containment of the production of plant-made therapeutics such as pharmaceutical or nutriceutical compounds either grown or expressed in or otherwise refined from harvested plant material is essential, both in terms of isolating the plant material during its growth to ensure no exposure to contaminants, and also in terms of isolating such plant-made compounds from spreading to or contaminating the environment as a whole. The spreading and/or cross propagation of a particular variety of genetically modified plant platform or crop which is beneficial for use as a pharmaceutical expression platform may be of no general environmental value and more importantly may in fact be harmful to the general environment and may not be fit for human or animal consumption or exposure. There is limited genetic containment in a greenhouse environment; however, there is a high risk that genetic containment will not be maintained for a number of reasons.

The first of these reasons is that greenhouses are susceptible to structural damage caused by storms, winds and acts of nature. Any breach of the greenhouse's structure caused by such an event, may result in a genetic outbreak of the genetically modified plant platform. Another reason for genetic cross-contamination is due to the possibility of escape of pollen-laden greenhouse air, through cracks or leaks in the structure or HVAC equipment. The final reason discussed here, is that of bio-terrorism and/or attempted theft of intellectual property. Greenhouses are an easy mark for both bio-terrorist groups that target producers of genetically modified organisms because of fanatical opposition to genetically modified plant platforms, and other parties who may wish to steal a specific type of plant platform for profit. From a business perspective, genetic containment is essential to reduction of liability associated with a breakout. From the just-in-time production viewpoint, and more pertinent to the claimed invention, genetic containment is essential to ensure the quality of the yield of the therapeutic compounds from the plant in order to make just-in-time delivery possible.

Those familiar with the related art will be aware of the benefits of a genetically isolated growth chamber such an underground growth chamber. The benefits are insofar that not only is genetic containment assured, but the possibility of act of corporate espionage, where either plants or processing methods are concerned, or even the possibility of acts of bio-terrorism in certain circumstances are greatly reduced or negated.

What has not been done to date is the "just in time" or scheduled production and delivery of harvested plant material or therapeutic plant compounds, in light of the limitations of plant platforms grown in fields, greenhouses or the like. It would be of significant benefit to industries including the pharmaceutical and nutraceutical industries if it were possible to come up with a method by which plant material and/or compounds therefrom could be scheduled for completion and delivered on a precise and exacting basis in which the forecasted and timely availability of various plant materials would lead to improved efficiency of their business models. The ability to conduct such plant production in a genetically contained growth chamber, which would minimize the possibility of contamination of the harvested plant material is only another desirable benefit but is also essential to the just-in-time production and delivery of plant material for use in the plant-made pharmaceutical and nutraceutical industries.

SUMMARY OF THE INVENTION

It is the object of the present invention to provide a method by which harvested plant material can be produced in a genetically-isolated growing environment on a scheduled basis. It is the further object of the present invention to provide a method for the scheduled production of harvested plant material or compounds therefrom wherein the crop is grown within a genetically-isolated underground growth chamber, whereby the crop during growth or harvest does not face the possibility of contamination by or exposure to genetic material or compounds from outside of the growing environment.

It is the further object of the present invention to provide a method for the modeling of a growth profile for a particular crop in a genetically-isolated underground growth chamber under at least one controlled growing condition, such that the modeled growth profile could subsequently be used to replicate the growth cycle of the selected crop by applying the same controlled growing conditions to any batch of starting crop material within a genetically-isolated underground growth chamber. The genetic containment of the production of plant-made therapeutics such as pharmaceutical or nutraceutical compounds either grown or expressed in or otherwise refined from harvested plant material is essential, both in terms of isolating the plant material during its growth to ensure no exposure to contaminants, and also in terms of isolating such plant-made compounds from spreading to or contaminating the environment as a whole. The spreading and/or cross propagation of a particular variety of genetically modified plant platform or crop which is beneficial for use as a pharmaceutical expression platform may be of no general environmental value and more importantly may in fact be harmful to the general environment and may not be fit for human or animal consumption or exposure.

It is the further object of the present invention to provide a genetically-isolated underground growth chamber within which plants can be grown in accordance with predetermined growth profiles such that the scheduled delivery or the completion of harvesting of such plant material can be accomplished.

It is the further object of the present invention to provide a method for the scheduled production of harvested plant material or compounds recovered therefrom, wherein the plant material is grown within a genetically-isolated underground growth chamber, such as a mine cavity or the like.

One embodiment of the invention is a method for the scheduled production of harvested plant material from which a plant compound can be recovered the first step of this method is to select a compound to be produced from a selected crop. Once the crop to be grown has been selected, the next step in this method is to select a predetermined growth profile for growth of the selected crop in a genetically-isolated underground chamber. The predetermined growth profile would comprise at a minimum the type of starting plant material to be planted to grow the crop; at least one controlled growing condition under which the crop is to be grown; and the period of time required from the time of planting the starting crop material to the point of the crop being ready for harvest, this period of time being the growth period.

One or more predetermined growth profiles could be maintained or kept for use in the chamber. For example, if different crops were to be grown different profiles might be used, or if different qualities or characteristics in a final crop could be achieved by varying the controlled growing conditions it may also be desirable to have more than one predetermined growth profile available for use with the same type of crop. It will be understood that the capability of the method and the growth chamber to use multiple growth profiles to replicate different sets of growing conditions for either the same or different crops is contemplated within the scope of the present invention.

The predetermined growth profiles will be sets of information related to the type of crop to be grown, starting plant material, and the conditions under which the growth of the crop has been tested and found to yield, within a particular growth period, plant material which is desirable for harvest in terms of its harvest time or characteristics. The method of development of these predetermined growth profiles for use in the genetically-isolated underground growth chamber of the present invention will be to effectively grow out one or more test batches of the crop in such a chamber and either monitor or adjust the growing conditions so that it is known under exactly what controllable conditions the particular growth pattern of the crop has been achieved.

The next key step in the method of the present invention is to select the scheduled delivery time for said harvested plant material—i.e. insofar as the method is a method of scheduled delivery of harvested plant material either in final or intermediate form, it is obviously necessary to simply determine when the finished product is required. This scheduled delivery time is required for calculations of the commencement of crop production.

Once the scheduled delivery time is known the planting time for the crop can be calculated by subtracting the growth period which is known from the predetermined growth profile that has been selected, from the scheduled delivery time. The time yielded from this calculation will be the planting time, at which the crop needs to be planted in the growth chamber in order to be finished and ready for harvest at the completion of the growth period.

The planting time and other starting crop particulars having been determined, the next step in the method of the present invention is to plant the selected crop in a genetically-isolated underground growth chamber at the calculated planting time. The starting crop material specified in the predetermined growth profile will be planted and grown in accordance with the growing conditions specified in the predetermined growth profile—i.e. by exercising careful control over the consistency of the starting plant material and the environment created within the underground growth chamber during the growth cycle of the crop, a very consistent completion timeframe can be achieved, and can in fact be forecast in advance of planting the crop. At the conclusion of the growth period or growth cycle, the crop will be harvested to obtain the desired harvested plant material. By control of the growing conditions of the crop in the environmentally controlled underground growth chamber in accordance with the selected predetermined growth profile, the conclusion of the growth period will predictably coincide with the scheduled delivery time.

The crops that could be produced in this fashion could be literally any plant crop. It is specifically contemplated that the crops could be any of natural plants, genetically modified plants, conventionally bred plants, or transient plants.

Similarly, while the types of plants that could be produced in this fashion could vary widely, the starting plant material that could be used within the chamber could also be varied—i.e. plant seeds, plant cuttings or plant propagating material could be used, and it will be understood that any type of starting material that can be used to germinate or grow a particular crop are contemplated within the scope of the present invention.

One or more of the growing conditions inside of the genetically-isolated underground growth chamber may be stipulated by the predetermined growth profile selected for use. It is specifically contemplated that of the many types of growing conditions that could be controlled to produce a forecastable crop yield both in quantity and quality and/or harvest completion time, the controlled growing conditions which might be included in a growth profile might be selected from the following: specific species of crop to be planted; physical source of supply of the selected starting crop material; growth medium in which the starting crop material will be planted; lighting parameters for use within the growth chamber to provide the desired lighting profile for the crop being grown at the desired times; temperature or humidity parameters for use within the growth chamber during the growth period, irrigation parameters for use within the growth chamber to provide the desired irrigation profile for the crop being grown at the desired times; air quality parameters for use within the growth chamber to provide the desired air contents for the crop being grown at the desired times; wind parameters for use within the growth chamber to provide the desired wind profile for the crop being grown at the desired times; fertilizer parameters for use within the growth chamber to provide desired amounts and types of fertilizer to the crop being grown at the desired times; one or more hydroponics growing parameters, where hydroponics plant growth techniques to be employed; temperature parameters for use within the growth chamber for the crop being grown at the desired time; or specific types of equipment to be used within the growth chamber at desired times during the growth of the crop. Other types of growing conditions which might be preset or controlled will be obvious to one skilled in the art, and it will be understood that any environmental condition within a growth chamber which can be monitored and/or affected or controlled is contemplated within the scope of the present invention.

The growth profile may stipulate that a number of particular environmental conditions be created at the outset of crop planting, i.e. at or before the planting time, and maintained in a constant phase through the growth of the crop, or it could also be the case that the growth profile would include instructions or parameters by which certain of the controlled growing conditions would be adjusted or altered at certain preset times during the growth period. It might also be the case that certain conditional logic is included within a particular growth profile which would stipulate that upon detection of a particular condition or state during the growing period a particular adjustment to one or more of the controlled growing conditions should be made. It will be understood that all such logic or conditional behavior to be built into a particular growth profile to accomplish the objective of a forecastable growth period and harvest time are contemplated within the scope of the present invention.

Going beyond the forecasting of a particular harvest time for plant material in accordance with the method of cultivation disclosed heretofore, the growth profiles in their development or testing might also determine with predictable accuracy the plant material yield in both quality and quantity from a particular quantity and type of starting plant material. If a particular yield were known of a set amount of starting plant material, the right amount of starting plant material could be planted and grown in accordance with the growth profile to yield the desired finished product quantity.

Beyond the upstream production of harvested plant material in a scheduled fashion for downstream use, the method of the present invention could be further enhanced by the addition of an compound downstream processing aspect comprising recovering at least one desired compound from the harvested plant material. This compound downstream processing aspect could consist of, in advance of calculation of the planting time, selecting a downstream processing method to be used to recover said at least one compound from the harvested plant material, wherein the amount of time required to conduct said downstream processing method on the harvested plant material, being the downstream processing period, is known. The calculation of the planting time would then be modified by subtracting both the growth period and the downstream processing period from the scheduled delivery time to yield the planting time. Then at the conclusion of harvesting the crop yielding the desired harvested crop material, the selected downstream processing could be performed upon the harvested plant material to yield the compound or compounds in question. By performance of the downstream processing step as selected and determined in advance, the conclusion of the downstream processing period will approximately coincide with the scheduled delivery time.

One or more compounds may be desired to be recovered from the harvested plant material in the downstream processing stage. If the number of compounds to be recovered is more than one, with different downstream processing periods for different ones of these compounds, the downstream processing period which could be used to calculate the planting time is the longest time required to produce and/or extract any of the desired compounds. Alternately, a specific one of the multiple downstream processing times in these circumstances might be chosen as the governing downstream processing time to be used in the adjustment or calculation of the planting time to achieve an optimal completion result.

The extraction or downstream processing step could take place either in the underground growth chamber or complex, or at a site remote therefrom. In the case of a remote downstream processing site, any transportation or handling times for the movement of harvested plant material or recovered compound to or from the underground growth chamber could be factored into the downstream processing period used to determine the appropriate planting time, again to optimize and predetermine the scheduled delivery time, being the completion time for the extraction or downstream processing.

There is also disclosed a method for the scheduled production of at least one plant compound, said method comprising first selecting at least one plant compound to be produced from a selected crop; selecting a predetermined growth profile for growth of the selected crop in a genetically-isolated underground chamber, said predetermined growth profile comprising the type of starting plant material to be planted to grow the crop; at least one controlled growing condition under which the crop is to be grown; and the period of time required from the time of planting the starting crop material to the point of the crop being ready for harvest, this period of time being the growth period. The next step in this method is to select one or more downstream processing methods to be used to recover said at least one plant compound from the harvested plant material, wherein the amount of time required to conduct the downstream processing of each plant compound, being the downstream processing period, is known. Finally, the scheduled delivery time for the completed compounds would be determined, and the planting time could then be calculated in accordance with the predetermined growth profile and known downstream processing period, by subtracting the growth period and the downstream processing period from the scheduled delivery time. The next step in this method after calculating the planting time would be to, in a genetically-isolated underground growth chamber at the calculated planting time, plant the starting crop material specified in the predetermined growth profile and growing the crop in accordance with said at least one controlled growing condition specified in the predetermined growth profile. At the conclusion of the growth period, the crop would be harvested to obtain the desired harvested plant material. Each desired plant compound would then be recovered from the harvested plant material in accordance with the previously selected downstream processing method and downstream processing period. By control of the growing conditions of the crop in the environmentally controlled underground growth chamber in accordance with the selected predetermined growth profile and conducting the downstream processing of the plant compounds from the harvested plant material in accordance with the selected downstream processing methods and the known downstream processing periods, the conclusion of the downstream processing period predictably coincide with the scheduled delivery time.

The growth profile might contain growing condition information for one or more crops, so that one or more crops might be grown in the controlled environment of the growth chamber at the same time.

There is also disclosed a method for modeling a growth profile for a crop for use in the scheduled production of harvested plant material from which a plant compound can be recovered, said method comprising growing a quantity of starting crop material of the crop in a genetically-isolated underground growth chamber under at least one monitored and controlled growth condition until said crop is ready to be harvested, wherein said growth profile comprises at least the type of starting crop material used; details of said at least one controlled growing condition such that said controlled growing conditions can be subsequently replicated; and the time required from planting the starting crop material to the harvest of the plant material therefrom, being the growth period. All of the variations or permutations on the growing conditions which might be controlled in the growth chamber environment and which might be covered in such a growth profile as are otherwise outlined herein could be included in the development of a growth profile in accordance with this method.

In another aspect, the present invention accomplishes its objectives comprising a genetically-isolated underground growth chamber for use in the scheduled production of harvested plant material from which at least one plant compound can be recovered, said growth chamber being equipped to control the growth environment for plants planted therein, and wherein said growth chamber is equipped to replicate at least one predetermined controlled growing condition under which crops may be grown therein; wherein at least one selected crop can be grown in said growth chamber, in accordance with a predetermined growth profile comprising at least the type of starting plant material to be planted to grow the selected crop; at least one controlled growing condition under which the crop is to be grown; and the period of time required from the time of planting the starting crop material to the point of the crop being ready for harvest, this period of time being the growth period. Upon planting of a selected crop in accordance with such a predetermined growth profile, the growth chamber is capable of replicating said at least one predetermined growing condition contained in the growth profile and wherein upon planting a crop in said chamber at a planting time calculated by subtraction of the growth period from the scheduled delivery time for the crop, upon completion of the growth period under the predetermined controlled growing conditions specified in said growth profile the crop will be ready for harvest, yielding harvested plant material at approximately the scheduled delivery time.

This growth chamber might be equipped to replicate or control growing conditions of the following types: growth medium in which the starting crop material will be planted; lighting parameters for use within the growth chamber to provide the desired lighting profile for the crop being grown at the desired times; irrigation parameters for use within the growth chamber to provide the desired irrigation profile for the crop being grown at the desired times; air quality parameters for use within the growth chamber to provide the desired air contents for the crop being grown at the desired times; wind parameters for use within the growth chamber to provide the desired wind profile for the crop being grown at the desired times; fertilizer parameters for use within the growth chamber to provide desired amounts and types of fertilizer to the crop being grown at the desired times; temperature parameters for use within the growth chamber for the crop being grown at the desired times; humidity parameters for use within the growth chamber for the crop being grown at the desired times; one or more hydroponics growing parameters, where hydroponics plant growth techniques to be employed; or specific types of equipment to be used within the growth chamber at desired times during the growth of the crop.

The growth chamber could also include downstream processing equipment capable of recovering at least one desired compound from the harvested plant material, wherein by performance of the downstream processing step as selected and determined in advance, the conclusion of the downstream processing period will approximately coincide with the scheduled delivery time.

The growth chamber could either be a natural underground void, or a man-made excavation or cavity such as a mine drift.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Effectively the present invention provides a method by which 'just-in-time' production of harvested plant material can be implemented using controlled growing conditions in a genetically-isolated underground growth chamber. Just-in-time production of the plant material, in an environment in which the possibility of exposure to genetic material or contaminants from outside the growth chamber is minimized, is accomplished by the method of the present invention, which is described in further detail below. The following sections are intended to provide in further detail an outline of the illustrated embodiments of the present invention, and the contemplated scope of the invention intended to be covered herein.

Figure 1:
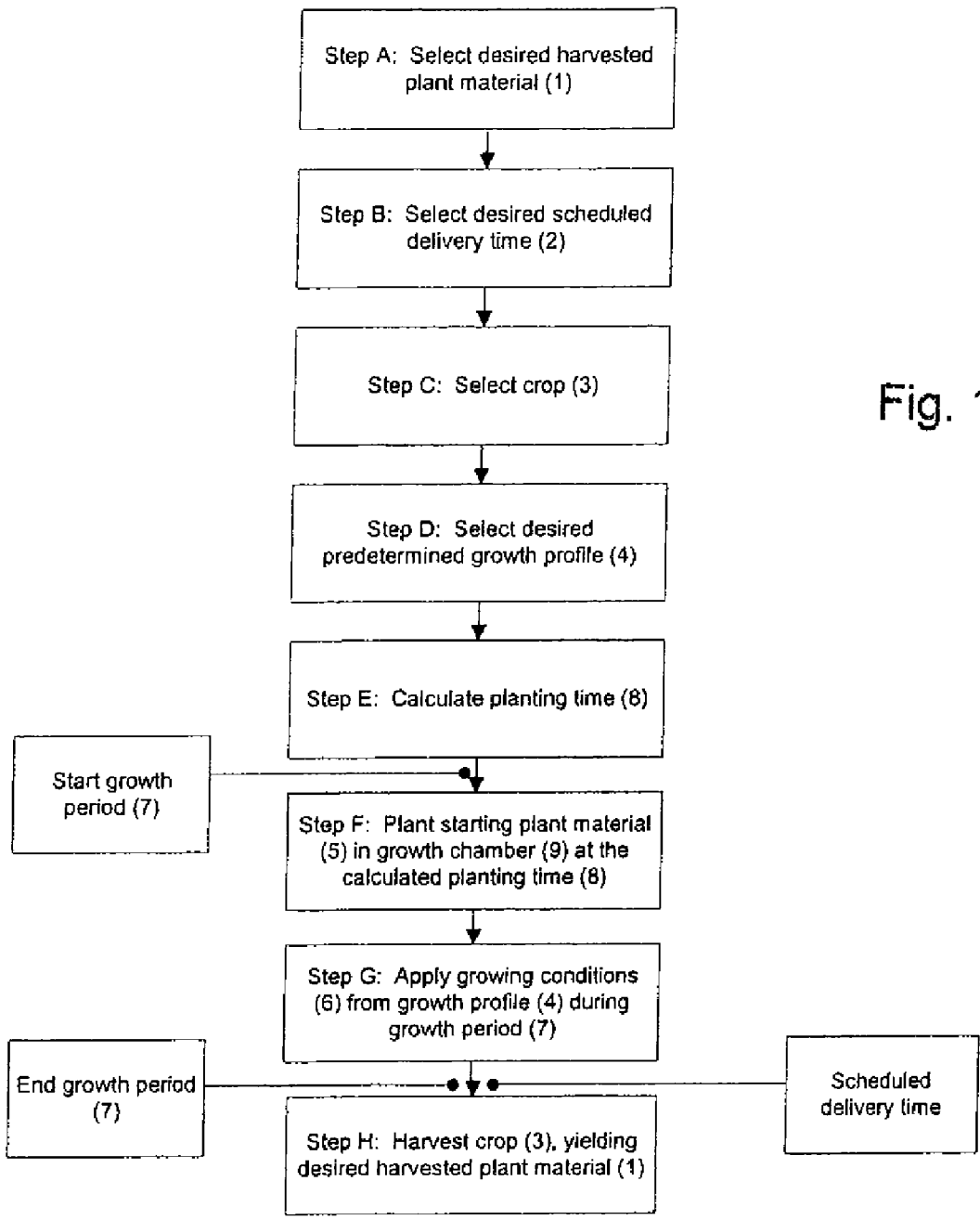
FIG. 1 is a flow diagram showing one possible simple embodiment of the method of the present invention, wherein a single type of harvested plant material is being produced.

Production of Harvested Plant Material:

Referring to FIG. 1, the general method of the present invention will now be discussed. FIG. 1 shows a flow diagram of one embodiment of the method of the present invention, in which harvested plant material of a single plant variety or crop is being produced on a scheduled basis.

As outlined throughout the disclosure herein, the general concept of the present invention is to provide a method for the scheduled production of harvested plant material from which one or more plant compounds might be recovered for use in any number of applications. It is specifically contemplated that the method of the present invention will be of great utility in the pharmaceutical and nutraceutical industries, where plant feedstocks or plant compounds are required on a larger and larger basis as those industries evolve, and the ability for producers in those fields to lower inventories in various plant stocks or compounds by having access to a predictable and time-managed supply of plant materials or compounds will be of great economic benefit.

As outlined elsewhere herein, it is also of great importance in these industries, such as the PMP (plant made pharmaceutical) or other pharmaceutical or nutriceutical extract industries in which extract or compound purity is of great importance, that the harvested plant material which is used as the feed stock for whatever recovery method is required to be used be grown not only in strictly controlled conditions but also in an environment in which the possibility of exposure to genetic material from outside of the growth chamber is either totally negated or significantly minimized.

Referring to FIG. 1, the first step in the method of the present invention is to determine the type of harvested plant material 1 to be supplied. This is shown at Step A in FIG. 1. It is also necessary to the method, and key to the implementation of a just-in-time delivery system, to know the scheduled delivery time 2 for the product. Acquisition of the scheduled delivery time 2 is shown at Step B in FIG. 1. The type of harvested plant material required 1 and the required delivery timeline 2 would typically be the information given to the producer by the customer. With this information in hand the remainder of the preparatory work can be done to produce the required plant material 1 in accordance with the method of the present invention.

Once the type of harvested plant material 1 required is known, the proper crop 3 can also be determined. For example it may be possible to obtain the right type of harvested plant material from the growth of one or more crops 3, so the producer may be able to choose a crop 3 which is known to them or from a specific bank of seed or plant material which is used. Selection of the crop 3 is shown at Step C in FIG. 1.

The next step in the method, shown at D, is the selection of a predetermined growth profile 4 for use in the production of the selected crop 3. The producer may have a library of one or more predetermined growth profiles 4 which have been developed to aid in the rapid start-up of production batches of known crops. The growth profile or profiles 4 from which the producer can choose would have been previously determined using test growths or test batches of crops to assess the proper growing conditions in which to accomplish the desired crop production objective. In any event, the growth profile selected 4 will identify, at a minimum, the type of starting plant material 5 to be used (seeds, cuttings, other material) and will also identify at least one controlled growing condition 6 under which the crop is grown from the starting plant material. Also within the growth profile 4, it will be known what the period of time is from the time of planting the starting plant material to the time that the crop is ready for harvesting as harvested plant material, where the crop is grown under the controlled growing conditions contained within the growing profile. This period of time within which the crop is fully grown to the harvest stage being the growth period 7. The predetermined growth profiles 4 from which the producer will select the proper profile for the particular batch or method will have been designed for use in a genetically-isolated underground growth chamber, and more particularly will have been designed for use and subsequent replication in the specific type or types of genetically-isolated underground growth chambers operated by the producer. For example, if an underground growth chamber is used, the growth profiles 4 will have been designed for such an underground chamber whereas if some type of an above-ground building is used as the genetically-isolated growing chamber required by the method of the present invention, the growth profiles 4 will have been developed specifically for use in that chamber or chambers, in accordance with their capabilities and limitations. It will be understood that any type of a growing profile 4 could be developed to accommodate the technical capabilities or limitations of any particular genetically-isolated underground growth chamber which might be chosen by the producer, and that all such growth profiles 4 and growth chambers are contemplated within the scope of the present invention, insofar as any such variants are still capable of accomplishing the goal of the present invention which is the scheduled and timely production of harvested plant material in a genetically-isolated growing environment.

Knowing the growth period 7 and the scheduled delivery time 2 will allow for the computation of the proper planting time 8 for the crop in accordance with the selected growth profile 4. The planting time 8 will be determined by subtracting the growth period 7 from the scheduled delivery time 2. This is shown at Step E in FIG. 1.

The selected predetermined growth profile 4 will stipulate the type of starting plant material 5 to be used in cultivation of the crop in question. The next step in the method, shown as Step F in FIG. 1, is to plant the crop in a genetically-isolated underground growth chamber 9 at the calculated planting time 8. The proper type of starting plant material 5 will be known from the selected growth profile 4. One or more of the controlled growing conditions 6 stipulated in the growth profile 4 may be other planting parameters such as fertilizer or growth medium requirements or the like for the planting of the starting plant material. The crop will then be grown in the growth chamber 9 under the growing conditions 6 stipulated in the selected predetermined growth profile 4 until the conclusion of the growth period 7—this step is shown at G in FIG. 1.

An underground growth chamber 9 has been selected as the primary environment within which to practice the method of the present invention for a number of reasons. These include the fact that the chamber 9 is relatively secure from outside interference in terms of trespass, contamination or espionage activity. As well, the environment in such a chamber 9 is effectively inert, so it is possible to have near-perfect control over all of the growth parameters within the chamber 9 to provide a very accurate and consistent growth environment which is under the complete and customizable control of the producer. Most important to the success of the method of the present invention in producing plant compounds of high purity in a timely fashion is the fact that the growth chamber used is a genetically-isolated space. By "genetically-isolated", what is meant is that the particular growth chamber is of the specific type or characteristics that the possibility of contamination of the growing crop or exposure of the growing crop to genetic material from outside of the growth chamber (i.e. avoiding airborne pollens or contaminants, ground water which might contain certain compounds or contaminants which are desired to be avoided etc.). It is specifically contemplated that an underground growth chamber such as a mine cavity or the like would accomplish this goal, but it will also be understood that some type of an above-ground facility could be designed which would allow for the necessary environmental control to implement the just in time method of the present invention while minimizing or negating the possibility of outside contamination. It will be understood that any type of a growth chamber in which growing conditions can be controlled in a near-perfect way, and in which the possibility of exposure to or contamination by genetic or other materials from outside of the growth chamber is either negated or minimized, as might be obvious to one skilled in the art, are contemplated within the scope of the present invention.

Once the end of the growth period 7 is reached, the crop can be harvested from the growth chamber 9, shown at Step H in FIG. 1. The harvested crop is the harvested plant material 1 required by the customer, and by growing the crop within the growth chamber 9 in accordance with the predetermined growth profile 4, specifically using the predetermined starting plant material and controlling the growing conditions of the crop during the growth period as required by the growth profile 4, the end of the growth period 7 should effectively coincide with the scheduled delivery time 2.

To demonstrate the simple concept of the process of FIG. 1, consider the following example. A producer of plant made pharmaceuticals wishes to produce tobacco plants, in order to recover a particular glycoprotein from the leaves of the tobacco plants—plants are used as a bio-reactor of sorts in the production or expressions of various crude extracts or pharmaceutical compounds (PMPs), which might then be further processed by a pharmaceutical company or others into a finished therapeutic compound. Everything through to the completion of the therapeutic compound could be scheduled in accordance with the method of the present invention, insofar as the refinement or other processing of crude plant extracts or compounds into finished therapeutic or other compounds could all be a part of the downstream processing step of the method of the present invention as outlined herein.

By growing several test batches of tobacco plants in an underground growth chamber it is determined that the approximately time required to grow the plants to maturity for harvesting is 38 days, and particular lighting, watering, temperature and humidity requirements are noted which result in the optimal production of the plants. For tobacco plants then, the growth profile which results from the testing might contain the specifics of the fertilizer or nutrient levels to be in the earth when the plants are started, the fertilizer if any to be applied within the 38 day growth period, as well as the amount of light and water to provide to the plants each day and the humidity and temperature levels at which the growth chamber should be maintained. If a customer then places an order for the tobacco leaf stock from which the glycoprotein in question is to be extracted to be delivered in 50 days it can be calculated that by using the same type of starting plant material as the growth profile was based upon, and by applying the same predetermined controlled growing conditions to the growth chamber during the growth period, the tobacco crop could be planted twelve days after the order was received, and at the expiry of the 38 day growth period the crop harvested for timely delivery to the customer. This is given as only one example of an industrial application for the on-time plant production method of the present invention—as outlined above, the method could have great applications in other industries as well, which industries might be illustrated in further detail below.

This first example is shown just to illustrate the general concept of producing harvested plant material, such as the raw tobacco leaves or plants of that example, in accordance with a delivery timetable. It will be described in further detail below that the step of recovery of the particular glycoprotein, monoclonal antibody or the like from the plant material could also be incorporated into a more detailed schedule, thus resulting in the ability to schedule the production of such an end compound from planting to completion using the method of the present invention.

By using a predetermined growth profile 4 which has also been designed by growing out test batches of a particular crop in a particular genetically-isolated underground growth chamber in which growing conditions can be closely monitored and controlled, it is possible to produce on a very predictable basis subsequent batches of the crop when grown in the same type of a chamber under the same type of controlled growing conditions as were previously monitored or designed for the growing profile 4.

The growth chamber 9 would be equipped with the necessary equipment to control or create the growing conditions required by the growth profiles 4 to be practiced therein. For example, irrigation equipment would be used to control the application of water or fluid-borne fertilizer or nutrients to plants growing in the chamber, or lighting equipment could be used to simulate particular lighting profiles or provide a predetermined amount of light to the growing crop. Computer control could be used to completely streamline and increase the accuracy and control of the growing conditions within the growth chamber.

Crop Specifics:

It will be understood that various types of plants or crops could be produced in accordance with the present invention. In fact it is contemplated that any type of a plant or crop would be contemplated within the scope of the present invention insofar as such plant or crop could be planted, cultivated or harvested within an indoor underground growth chamber with a controlled environment.

The starting crop material for the crop or crops to be planted could be plant seeds, plant cuttings or some other type of plant propagating material. Any type of a plant propagating material which could allow for the growth of the desired crop is contemplated within the scope of the present invention.

It will be obvious to one skilled in the art that dependent upon the type of starting plant material to be used, or even to an extent upon the type of crop to be grown, certain changes in the general or specific equipment, growing media, growing trays or other items within the growth chamber might be required, and insofar as the present invention contemplates whatever such changes are necessary as part of the controlled growing conditions which might be specified in a particular predetermined growing profile all such modifications are contemplated within the scope of the present invention.

In certain cases precursor work must be done in advance of even developing a growth profile for commercial use in a method in accordance with the present invention. For example, in certain cases one of the initial steps which might be conducted is the actual modification of starting plant material to bear the desired plant-made therapeutic compound. This might involve modification or breeding development of the crop and/or screening of plant genetic stock. While the preparation of the starting plant material in this fashion is beyond the steps of the method of the present invention outlined herein, it will be understood that the incorporation of certain such steps into the method of the present invention might be contemplated by one skilled in the art. For example if the starting plant material for any particular batch of a crop needs to be altered or affected in some way in order to behave in the desired fashion during its growth or harvesting, that might be understood by one skilled in the art as a step involved in or along with the planting of the crop, such that the growth of the crop including these precursive steps is included within the growth period known in a particular predetermined growth profile.

It may also be the case that more than one type of harvested plant material 1 is grown in the growth chamber 9 at the same time, in order to produce more than one type of harvested plant material 1 for extraction at the same time or for obtaining additional compounds for use by the same customer or the like. For example, it may be the case that a particular customer requires compounds from 4 different plants and it may be the case that a predetermined growth profile 4 could be designed which could allow for the growth of these 4 different plant crops 3 in the growth chamber 9 at the same time, either in separate chambers or in the same chamber, and by knowing the particular growth period 7 for each of those crops 3, as well as the downstream processing period 12 for the type of compound to be obtained from each of those particular types of plant material 1, the method of FIG. 4 could be practiced to allow for the enhanced scheduled delivery of a package of plant compounds from more than one type of plant material 1 in a scheduled fashion as well.

The Growth Chamber:

The characteristics or attributes of the genetically-isolated underground growth chamber 9 are key to the practice and success of the present invention. An underground growth chamber 9 is optimal for use in the practicing of a scheduled delivery method for plant material 1 such as that proposed herein, since an underground growth chamber 9 is capable of best supplying a completely inert and controllable plant growing environment. A growth chamber 9 located underground is obviously secure insofar as there would be a limited number of entrances or exits and, beyond physical security, the limited access to the chamber also provides for the ability to have very close control over the air quality and other attributes of the environment within the chamber 9. Effectively, as long as the proper equipment is in place, an underground growth chamber 9 can be used to simulate virtually any growing environment in a tightly controlled and precise fashion.

It is thought that one type of an underground growth chamber 9 which could be used to practice the method of the present invention are exhausted or abandoned mine cavities. Underground mine cavities have been used in the past for plant cultivation, but have never before been used in accordance with the precisely controlled and scheduled growth method proposed herein, which results in the ability to deliver on a scheduled basis plant material or plant compounds based on plant material 1 grown in such a growth chamber 9. These types of sites are available and otherwise unused and, as such, the ability to use these areas for some productive purpose has also some economic or social benefit as well.

In terms of the specific equipment which would need to be available in the environmentally controlled underground growth chambers 9, the necessary equipment would be anything required to potentially implement, apply or control any of the various growing conditions 6 which it might be desired to use in association with any crop 3 to be produced therein in accordance with the method of the present invention. For example, if it was desired to produce plants hydroponically in the growth chamber 9, hydroponics growing media and equipment would need to be available in the growth chamber 9. Alternatively, however, if conventional growth means were to be used, the chambers 9 would potentially each need to be equipped with normal growth media such as soil in planting trays or other containers.

Obviously, the air in the growth chambers 9 could be filtered and/or otherwise treated by the addition or removal of humidity therefrom, for example, and as such the controllable nature of air quality in the growth chambers 9 would be another aspect of the chamber 9 which the necessary equipment would need to be present to supply, if controlling the air quality in the particular growth chambers 9 were of concern to the producer in question. There would also be potentially, in most implementations of the method and growth chamber 9 of the present invention, irrigation and lighting equipment which would allow for the proper irrigation and lighting of crops 3 grown within the chambers 9 under the controlled growing conditions 6 specified in a particular plant growth profile 4.

It is contemplated that all of the environmental control systems in the chambers 9 could be instrumented such that they could be computer controlled, which would allow for very precise monitoring and control of the growing conditions 6 within the growth chambers 9 during the production of the harvested plant material 1 in question.

Genetic Isolation of the Growth Chamber:

By "genetically-isolated", what is meant is that the particular growth chamber is of the specific type or characteristics that the possibility of contamination of the growing crop or exposure of the growing crop to genetic material from outside of the growth chamber (i.e. avoiding airborne pollens or contaminants, ground water which might contain certain compounds or contaminants which are desired to be avoided etc.). It is specifically contemplated that an underground growth chamber such as a mine cavity or the like would accomplish this goal, but it will also be understood that some type of an above-ground facility could be designed which would allow for the necessary environmental control to implement the just in time method of the present invention while minimizing or negating the possibility of outside contamination. It will be understood that any type of a growth chamber in which growing conditions can be controlled, and in which the possibility of exposure to or contamination by genetic or other materials from outside of the growth chamber is either negated or minimized, as might be obvious to one skilled in the art, are contemplated within the scope of the present invention.

The genetic containment of the production of plant-made therapeutics such as pharmaceutical or nutriceutical compounds either grown or expressed in or otherwise refined from harvested plant material is essential, both in terms of isolating the plant material itself during its growth to ensure no exposure to contaminants, but also it is key to provide a method of production of such plant-made compounds that is internally contained—i.e. the plant material is contained from spreading in or contaminating the environment as a whole, as the spreading or mutation of a particular variety of plant material or crop which is beneficial for use as a pharmaceutical expression platform may be of no general environmental value and may in fact be harmful to the general environment and may no be fit for general human or animal consumption or exposure. The benefits of a genetically isolated growth chamber such an underground growth area will even be beneficial insofar as the possibility of some type of act of corporate espionage, where plants or processing methods are concerned, or even the possibility of some type of an act of bio-terrorism in certain circumstances are limited or negated.

It is specifically contemplated that underground growth chambers would be optimal to practice the method of the present invention, such as underground mines or quarries. It will also be understood that a natural underground void might also be used, or in certain circumstances an above-ground growth chamber could be envisioned which was sufficiently secure and contained so as to be used in the method of the present invention. It is specifically contemplated that the underground growth chambers outlined herein would be optimal for the purposes of the present invention, but it is intended that any type of a growth chamber including either above- or below-ground chambers which allow for complete environmental control and which are sufficiently genetically contained so as to isolate crop production therein from the outside environment are contemplated within the scope of the present invention.

Predetermined Growth Profile:

As outlined above, the development of a predetermined growth profile with respect to a particular crop is a precursor to the practice of the method of crop production outlined herein. Effectively the predetermined growth profile for a crop is a set of data or parameters which outline the growing conditions used with a particular type of starting plant material to grow a particular crop for harvest within a particular growth period.

The growth profile will likely be arrived upon by growing out one or more test batches of a crop within the genetically-isolated underground growth chamber to determine the growth period required and the optimal set of growing conditions. Once the proper growing conditions are determined, those conditions can then be simulated or reapplied to subsequent batches of the same crop grown within a similar chamber, to result in crop production in a similar growth period.

Figure 2:
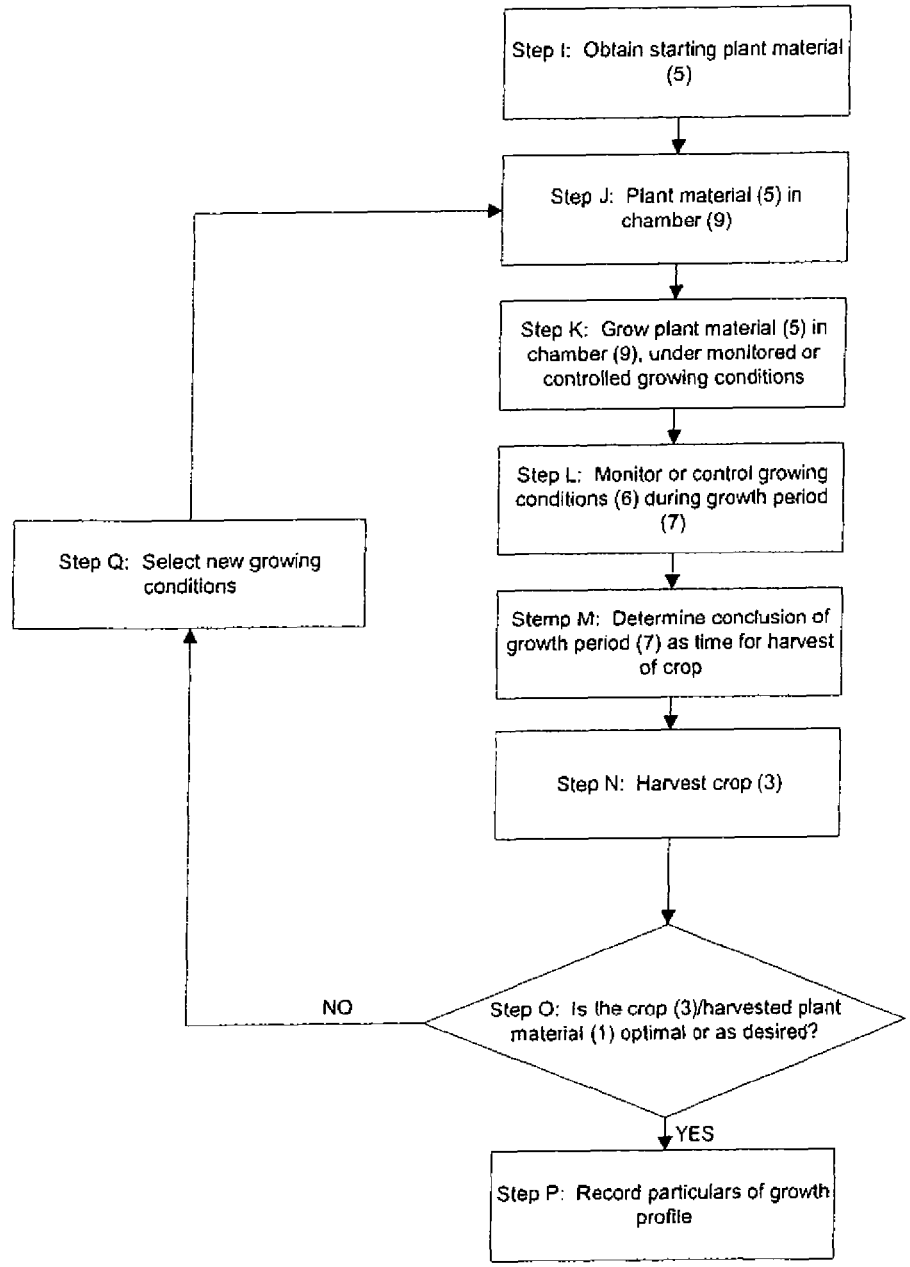
FIG. 2 is a flow diagram demonstrating one possible embodiment of the method of testing or development of a growth profile for a crop in accordance with the present invention.

Referring to FIG. 2, there is shown one embodiment of a method of development of predetermined growth profiles for at use with the crop production method of the present invention. The first step in that method, shown at Step I, is to select the crop or plant for which the growth profile 4 is to be developed. The starting plant material 5 from which that crop is to be grown is also selected. The first physical step in the method of FIG. 2 is to prepare and plant the starting plant material 5 in a simulator or chamber 9 such as those which will be used in the commercial practice of the growth profile 4.

The growth chamber 9 would be equipped to simulate or provide various controlled growing conditions 6 which would be applied to the crop 3 during the growth period 7. Growing the crop 3 in the chamber 9 while monitoring or measuring or adjusting the growing conditions 6 therein is shown at Step K in FIG. 2. Step L shows the specific monitoring or measurement of the growing conditions so that they could be subsequently replicated.

Once the crop is grown to completion and is ready to harvest, the conclusion of the growth period 7 can be selected. This is shown at Step M in FIG. 2. Step N demonstrates the harvesting of the crop 3 to yield the desired harvested plant material 1.

Step O shows the assessment of the final results of the test batch—if the growing conditions and resulting harvest plant material are determined to be satisfactory, the particulars of the rowing profile can be recorded for subsequent use. Alternatively if the results are not satisfactory, new growing conditions 6 could be selected (Step Q) and a new test batch planted.

The growth period 7 is effectively the amount of time required to grow the crop 3, from the time of planting of the starting plant material 5 to the time of harvesting the plant material 1. During the growth of the crop 3 in the growth period 7, the various growing conditions 6 which can be monitored and controlled in the growth chamber 9 will be monitored and tracked so that they can subsequently be replicated or applied in a similar underground growth chamber 9 to a new commercially sized batch of starting plant material 5.

In the simplest embodiment of the method of development of a growth profile 4, starting plant material 5 would simply be planted and various controllable growing conditions 6 monitored during the course of the growth period 7, such that the typical growing conditions 6 which were applied during the testing phase could be simulated or reapplied in the growth or production of a commercially sized batch of the crop 3 in accordance with the growth profile 4.

It may also be the case, however, that more than one batch of a crop 3 is grown out during the development of the growth profile 4, so that different variations of some of the controlled growing conditions 6 within the growth chamber 9 could be tested to come up with an optimized set of growing conditions 6 in which the crop 3 is to be grown.

During Step K of the growth period 7, the crop 3 is grown within the growth chamber 9 either by passively monitoring the controllable growing conditions 6 within the growth chamber 9 during the growth of the crop 3, or alternatively by actively adjusting the controllable growing conditions 6 within the growth chamber 9 during the growth period 7, to come up with an optimized or optimal set of controllable growing conditions 6 or growing condition parameters 11 which can be reapplied or simulated again in a similar type of growth chamber 9 with respect to a commercial batch of starting plant material 5 from which harvested plant material 1 is to be obtained.

Shown at Step M in FIG. 2 would be the determination as to the proper harvest time for the crop 3 once grown in the growth chamber 9 in accordance with or under the monitoring of the controlled growing conditions 6. Once the harvest time has been determined, the length of the growth period 7 for a particular crop to be grown from a particular type of starting plant material 5 is known.

Shown at Step O is the addition of the logic to the method of creation of a growth profile 4 to test for the desirability or optimization of the growth profile 4. Specifically, if the producer is happy with the growth profile 4 which has been arrived at by the growth of the particular test batch of the crop 3 in question outlined so far in FIG. 2, the data and parameters with respect to the growth profile 4 could be recorded and the creation of the predetermined growth profile 4 would be complete. However, if the producer were interested in growing another test batch of the crop 3 to try the adjustment and modification of various controlled growing conditions 6 during the growth period 7, it is shown in FIG. 2 how an additional batch might be planted either at the same time as or subsequent to the harvest of the crop 3, so that a different grouping of controlled growing conditions 6 might be exercised upon the starting plant material 5 in question, to see what type of different type of growth or production results might be obtained.

It is contemplated that for the purposes of the method of the present invention, the bare data or information which a particular predetermined growth profile would need to have to be of utility would be an identifier of the type of starting plant material used to create the set of controlled growing conditions under which the crop can be cultivated, the details of at least one controlled growing condition to be simulated or applied to the starting plant material during the growth of the crop in an underground growth chamber, and finally the growth profile would also include the amount of time from planting to harvest, being the growth period, for that particular crop if grown under the controlled set of circumstances prescribed by the growth profile.

It would also be possible to include in a particular growth profile further data regarding the crop yield obtained from a particular quantity of starting plant material, so that in a more advanced rendering of the method of the present invention the producer could actually determine how much starting plant material of a crop they needed to plant in order to produce a particular requested yield quantity of harvest plant material.

Controlled Growing Conditions:

It is intended that the genetically-isolated underground growth chamber used in the method of the present invention would be such that virtually every aspect of the environment created therein could be varied or controlled by the operator. Any number of different growing conditions could be controlled in order to standardize the production of a particular crop if a growth chamber such as the genetically-isolated underground growth chamber discussed herein were used.

In such a secure and otherwise inert environment precise control could be had over all of the relevant growing conditions involved in the production of a crop, from the time of planting the starting plant material in whatever type of growth medium were being used, through the growth cycle to the point of harvesting the plant material in question at the conclusion of the growth period. The following is intended to outline in further detail some of the items which might be contemplated as controlled growing conditions which might be included in a growth profile used to produce a plant crop in accordance with the method of the present invention.

One type of growing condition which it is anticipated would be controlled within the chamber, potentially by the producer manually adjusting the contents thereof in advance of planting the starting plant material, would be that of the growth medium. The growth medium in a typical crop growing situation might simply consist of soil, potentially with fertilizer or other materials or products blended therein or applied thereto. One of the controlled growing conditions which might be stipulated by the growth profile 4 could be the general nature or more particular aspects of the growth medium. Growth medium could also be something other than soil, for example where hydroponics were being practiced, as various types of hydroponics growth media could be used as well.

Other growing conditions which it is contemplated could also be controlled within the production of a crop, and could be controlled growing conditions in terms of the growing profile 4, could be the species of the crop, or the physical source of the starting plant material. Where there are more than one species or type of crop which could be grown to yield the desired harvested plant material for use or compounding purposes, the use of a particular species for which the growth profile 4 has been specifically developed can remove even more uncertainty from the growth of subsequent crop batches. Similarly it may be desirable to limit the source of supply of a particular type of starting plant material to certain sources or vendors or suppliers, since again the standardization of the inputs to the method of the present invention will result in a more standardized output. It is contemplated then that the producer or user of the method of the present invention would want to exercise fairly strict control over the seed library or library of starting plant material on which they are practicing the method.

It has been mentioned already that another controlled growing condition which is obviously going to have a noticeable effect on the growth of plants in the growth chamber is the lighting. It may be the case that particular types of lighting, or at the very least particular quantities of light, are to be provided to a crop to result in optimal growth and production during the growth period. The growth chamber would obviously be equipped with the necessary lighting equipment to provide whatever type or amount of light were required for a specific growing profile, and it is contemplated specifically then that the type or amount of lighting to be applied to a crop at particular times during the growth period are more controllable growing conditions which might be monitored or tested in the creation of, or applied in the subsequent use of, a particular growth profile for a particular crop.

Similar to lighting and as important as lighting to plant growth is that of irrigation. Specific types of irrigation may be required, to apply the right amounts of water or fluid with nutrients to plants at particular times during the growth period. Again, the growth chamber would be equipped with whatever necessary equipment to implement the required irrigation or fluid conditions, and it is contemplated again that watering patterns or levels are obvious controllable growing conditions which might be specified in a particular predetermined growth profile.

Air quality within the growth chamber is another obvious controllable growing condition. Specific filtration of incoming or outgoing air might be specified or required, or even particular humidity levels in the air might be required. The growth chamber would be equipped properly to accomplish or provide these air requirements—air quality or air parameters including humidity might then be other controlled growing conditions which might be specified in one or more growth profiles with respect to different crops.

Fertilizer requirements or the proper timing or application of fertilizer or other products such as pesticides or the like is another controllable growing condition which might be included in one or more predetermined growth profiles, and for which the growth chamber would need to be equipped.

If hydroponic cultivation was taking place, obviously different types of hydroponic growing media and other controllable growing conditions might be required again these might be included in certain growth profiles and if this were the case the growth chamber would need to be equipped to simulate or provide such conditions.

It will be understood that any number of other growing conditions for any type of plant could be contemplated by a person skilled in the art of cultivation of such plants, and any such growing conditions as could be monitored, simulated or provided within the growth chamber with the appropriate equipment in place are contemplated within the scope of the present invention.

Addition of Logic or Condition Variance to the Growth Profiles:

It is contemplated that in simpler embodiments of the method of the present invention the controlled growing conditions stipulated in a particular predetermined growth profile are fixed conditions which are to remain constant throughout the growth period. However, it is also contemplated that the logic of the method of the present invention can be enhanced in at least a couple of different fashions by incorporating conditional logic or predetermined variances in the growing conditions in a particular growth profile.

In certain cases it may be that certain of the controlled growing conditions for a crop need to be altered at particular predetermined points within the growth period for a particular crop—for example, on a particular day of a growth period extra fertilizer is to be applied, or at a particular stage in a growth period the average amount of daily simulated sunlight is to be increased or decreased. The predetermined adjustment of growing conditions within the growth chamber during a growth period as outlined herein are contemplated within the scope of the present invention. In the case where the growth chamber is instrumented so as to allow for computer control of the controlled growing conditions during the growth period, midstream adjustments to the controlled growing conditions at a predetermined schedule point during the growth period will be easily applied to the chamber environment.

A second type of modification for growing conditions which it is contemplated might be included in a particular growth profile for a crop would be conditional logic by which in identified situations certain adjustments to growing conditions would be triggered—upon the detection of a certain state or condition within the growth chamber. For example, if a sensor determined that the growth chamber was getting too hot, upon detection of that temperature or humidity state the control system for the growth chamber (or the operator in a non-instrumented manual embodiment) could make an instream adjustment to the lighting or other heating equipment until the temperature came down. Another example might be if a sensor detected overwatering, then the controlled growing conditions dealing with irrigation could be modified accordingly. All of these types of conditions would need to be calculated or analyzed in setting the growth profile in terms of the desired growth performance of the crop, and in the uniform growing environment which is created by the method of the present invention the need for such changes should be minimal, but the provision for conditional modifications to growing conditions within the growth chamber during the growth period is contemplated within the scope of the present invention.

Figure 3:
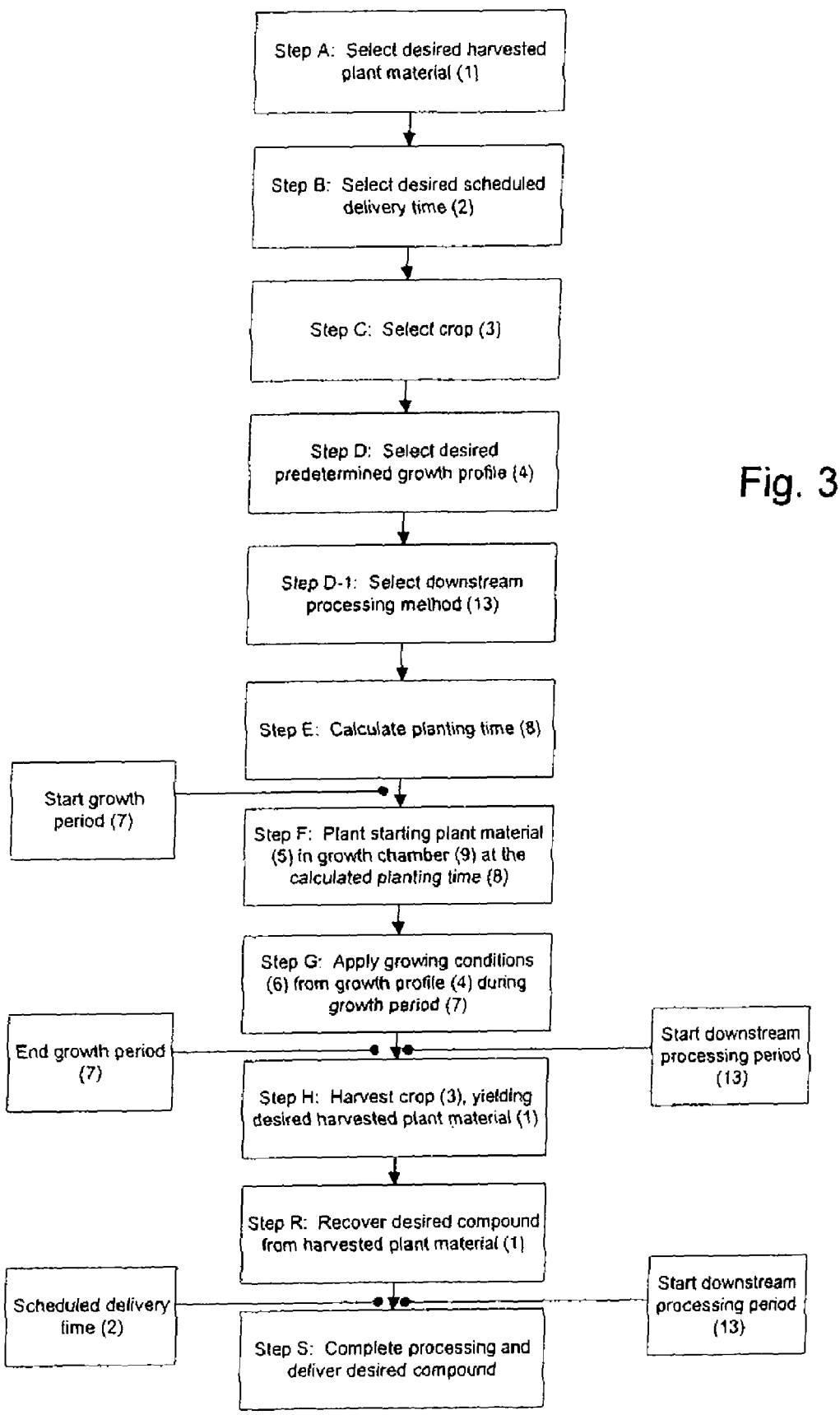
FIG. 3 is a flow diagram of a second embodiment of the method of the present invention with the addition of a downstream processing step, wherein a single compound is being recovered from the harvested plant material.
Figure 4:
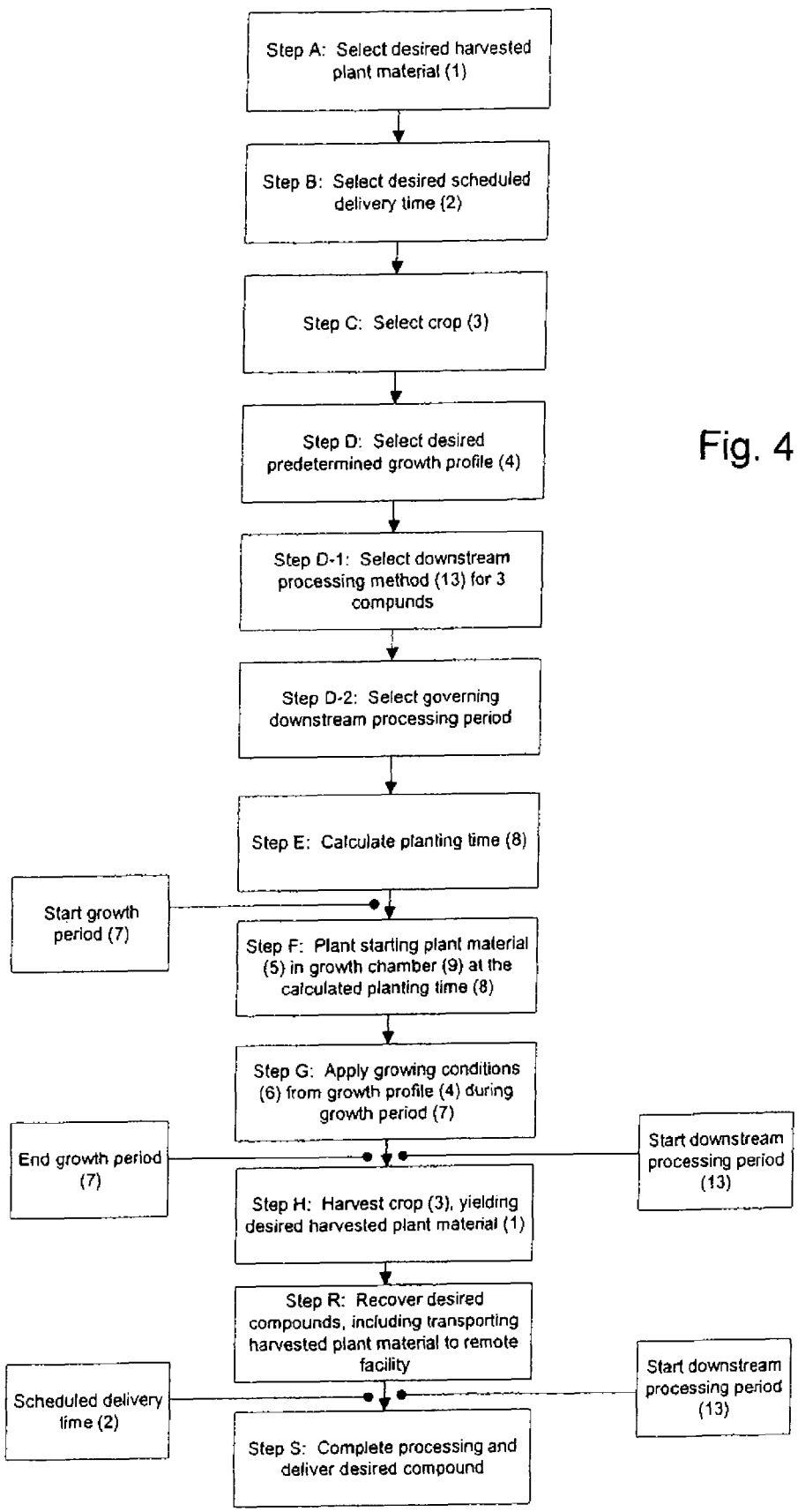
FIG. 4 is a flow diagram of a third embodiment of the method of the present invention, wherein multiple compounds are being recovered from the harvested plant material and the downstream processing is taking place at a remote downstream processing site.

Downstream Processing from Harvested Plant Material:

FIGS. 3 and 4 will now be used to demonstrate the addition of another stage to the process demonstrated in FIG. 1. Effectively it is contemplated that another step which could be added to the typical method of the present invention, following the harvesting of the harvested plant material 1 discussed above, is a downstream processing step, whereby if the final desired product is an compound or component to be recovered from the harvested plant material 1, rather than the harvested plant material itself, the step for the downstream processing of that desired compound or component might again be modeled into the method of the present invention, such that the scheduled production of the compound or component desired to be recovered from the harvested plant material 1 could also be achieved. What is potentially required in order to properly incorporate the downstream processing or recovery of one or more compounds or components from the harvested plant material 1 such that they can be delivered in a scheduled fashion is to know, for the type of downstream processing method 13 which is to be used to recover the desired component or compound from the harvested plant material 1, the amount of time which is required to perform the downstream processing of that compound or component upon the harvested plant material 1.

With this amount of time, being the downstream processing period 12, the computation of the planting time 8 could be adjusted such that the harvesting of the plant material 1 as well as the subsequent downstream processing therefrom of the desired components or compounds, will be completed at approximately the scheduled delivery time 2.

Referring then to FIG. 3, which is one modified embodiment of the method shown previously in FIG. 3, with the addition of a downstream processing step. As outlined, the downstream processing of one or more compounds or components from the harvested plant material 1 can also be accomplished in a scheduled delivery fashion by simply modifying the calculation of the starting planting time 8 for the crop 3 in accordance with the remainder of the method of the invention. In comparison to the embodiment of FIG. 1, the embodiment of FIG. 3 demonstrates the addition of a downstream processing step. Specifically, the downstream processing method 13 to be used to recover the desired compound from the harvest plant material 1, for which the downstream processing period is known, is shown at Step D-1. The calculation of the planting time for the crop can be altered upon selection of the downstream processing method, by subtracting both the growth period and the downstream processing period from the scheduled delivery time to yield the planting time.

A predetermined growth profile 4 must then be selected for use in the production of the crop 3 in question. As outlined above, the growth profile 4 might be selected from one or more growth profiles 4 which have been previously tested or developed for use in the production of the crop(s) 3 in question. The growth profile 4 would, as outlined previously, contain at a minimum information pertaining to the type of starting plant material 5 to be used with respect to the growth of the crop 3 in question, the particulars or parameters to be applied to one or more controlled growth conditions 11 during the growth of the crop 3 in an underground growth chamber 9, and finally the growth profile 4 would also contain information regarding the forecast growth period 7, or period of time required from planting to harvest, of the crop 3 in question if the specified starting crop material 5 is used and the growing conditions 6 of the crop 3 are controlled as specified in the growth profile 4.

The next item which would need to be determined, shown at Step D-1 in FIG. 3 is the selection or determination of the downstream processing method 13 to be used to recover the compound(s) or plant components, which are desired to be recovered from the harvested plant material 1. In terms of downstream processing, it will be understood that any number of different types of prior art downstream processing or extraction methods for the removal or downstream processing of certain components or compounds from harvested plant material 1 could be used in accordance with the method of the present invention, and beyond the timing aspect of the downstream processing method 13 it is contemplated that any type of a downstream processing or extraction method which could be used to recover a desired or beneficial compound or component from harvested plant material 1 is contemplated within the scope of the present invention.

Once a downstream processing method 13 is determined, the length of time required to recover the specific compound or component from the harvested plant material 1 will also be known. This period of time is the downstream processing period 12. In all likelihood, the use of the downstream processing method 13 to recover the particular compound or component in question would need to be previously modeled or tested similar to the development of the growth profiles 4, so that the length of time of the downstream processing period 12 could be known.

The key to the scheduled delivery of one or more plant compounds or components taken from harvested plant material 1 in accordance with the method of the present invention is the proper calculation of the starting planting time 8 for the crop 3 within an environmentally controlled underground growth chamber 9. As compared to the method of FIG. 1, the method of FIG. 3 would alter the calculation of the planting time 8 by subtracting first the growth period 7 and secondly the downstream processing period 12 from the scheduled delivery time 2, to yield the proper planting time 8 for the starting plant material 5.

Upon reaching the calculated planting time 8, the starting plant material 5 for the crop 3 would be planted in the growth chamber 9 and grown under the controlled growing conditions 6 stipulated in the growth profile 4 until the conclusion of the growth period 7. At the conclusion of the growth period 7, the crop 3 would be harvested to yield harvested plant material 1 in accordance with the first steps of the method of the present invention.

Upon completion of the harvesting of the harvested plant material 1, the compound(s) or one or more plant components, which are desired to be recovered from the harvested plant material 1, would be recovered in the downstream processing step of the process, shown at Step R in FIG. 3. Upon the completion of the downstream processing, the desired compound from the harvested plant material 1 would be completed, at the completion of the downstream processing period 12, approximately coincidental with the scheduled delivery time 2.

The embodiment of the method of the present invention shown in FIG. 3, which includes an extraction or downstream processing step by which at least one plant compound can be recovered from harvested plant material 1 in accordance with the method of the present invention is presented to demonstrate the downstream processing of a single plant compound from harvested plant material 1 produced in accordance with the method of the present invention. Consider the following example which will demonstrate the potential utility of the method of the present invention as demonstrated in FIG. 3.

In this example, oil is to be recovered from tobacco seed for use in pharmaceutical applications (this oil might be used as some type of a pharmaceutical intermediate, or might be desired as a compound from which a monoclonal antibody or glycoprotein produced in the growth of the particular tobacco crop might be recovered. The crop model which is encompassed by the selected growth profile 4 will result in the production of tobacco plants from some type of a selected starting plant material 5 which might be seed or otherwise, in a fixed period of time 2. For the sake of providing an example herein, we will say that the growth cycle required for the tobacco plants in accordance with the controlled growing conditions 6 stipulated in the growth profile 4 is 53 days.

To extend this example beyond that which was already demonstrated with respect to the embodiment of the method of FIG. 1, the next item which needs to be modeled or forecast is the downstream processing step. In this case, the steps that are required to recover the oil from the harvested plant material 1 are to dry the plant material to a certain level, recover the seeds from the plant material 1, and then press the seeds to remove the oil therefrom (this is simply a sample of an extraction or recovery process—there might be other steps or completely different downstream processing requirements than this, but this example is again used to simply demonstrate the use of the method of the present invention). If this is the downstream processing method 13 to be used, namely to dry the plant material, separate seeds from remaining material, and then to press the seeds to remove the oil which is the desired compound to be obtained from the harvested tobacco plant material, what is then required to be known is the approximate downstream processing period 12, or the length of time required from the harvesting of the tobacco plant material to the completion of the extraction process for the desired oil being the compound desired to be recovered. For the sake of illustration, we will say that the time required to complete the drying, separation and extraction of oil from the tobacco plant material is 9 days.

With respect to this particular example it is suggested that the extraction process would take place at the underground growth complex 9 rather than requiring any significant amount of transport of the harvested plant material 1 or the completed compound to or from a remote downstream processing site. As such, adding together the growth period 7 (53 days), and the downstream processing period 12 (9 days), the starting planting time 8 for the crop of tobacco would be 62 days. By planting the tobacco plant material 62 days in advance of the scheduled delivery time 2, the delivery schedule required can be met, including the downstream processing of the oil from the seed at the end of the harvesting of the actual rope material in question.

This example is intended to demonstrate the utility of the method of the present invention, including a downstream processing step, wherein it is desired to recover a single compound from a particular type of harvested plant material 1 produced in an environmentally controlled underground growth chamber 9 in accordance with the method of the present invention. It will be understood that many different types of recovery or downstream processing methods will be obvious or available to a person skilled in the art which would allow for the processing or handling of harvested plant material to either produce compounds or extracts therefrom, or alternatively other downstream processing may be used which finishes the harvested plant material as a whole into a desired product or compound. It will be understood that all such downstream processing methods are contemplated within the scope of the present invention insofar as their times for completion can be known and the remainder of the method of the present invention may thus be practiced.

Moving on to FIG. 4 there is shown another embodiment of a method in accordance with the present invention. FIG. 4 is intended to demonstrate the modifications which can be made to the calculations in the method of the present invention to still accomplish scheduled on-time delivery of the required plant compound(s) where firstly the downstream processing site for the plant compound(s) is a remote site from that of the underground growth chamber 9, and secondly where more than one plant compound is to be recovered from the same batch of harvested plant material 1.

Looking at FIG. 4, the first number of steps in the process are very similar to those shown in FIG. 3. For example, it needs to be identified which number of compounds are to be obtained, and then the crop 3 from which those compounds can be obtained needs to be selected. To extend the tobacco exampled used with FIG. 3 above, for the sake of demonstrating the method of FIG. 4 we will say that in addition to the oil to be recovered from the tobacco seeds, there is an additional compound to be recovered from the spent tobacco seeds once they are pressed to remove the oil, which might be removed for example by some type of a solvent extraction method. Finally, there may be a third compound which is desired and which can be obtained by removal from the spent harvested plant material once it is separated from the tobacco seed.

As such then, for the sake of demonstration of the method of FIG. 4, the three compounds which are intended to be recovered are firstly oil from the plant seeds, secondly another compound to be recovered by solvent extraction from the spent tobacco seeds once they have been pressed, and thirdly another compound which is to be removed in some other fashion from the plant material which has been separated from the seeds in advance of their pressing. With respect to each of these three compounds to be recovered from the harvested tobacco plant material, the nature of the downstream processing methods 13 to be used and the downstream processing period 12 or length of time needed to recover each particular compound from the particular plant material or component in question would be known.

Where multiple compounds are to be recovered from the harvested plant material 1, the downstream processing period 12 with respect to one of those compounds needs to be chosen as the governing downstream processing period 12 for use in the calculation of the planting time 8 of the crop. For example, if it takes 9 days to produce the oil from the harvested tobacco plant material, plus maybe an additional 4 days to perform solvent extraction of the second compound on the spent tobacco seeds after the oil downstream processing is completed, that would potentially leave a total downstream processing period 12 of 13 days to be used in the calculation of the planting time if the solvent extracted component were to be delivered to the customer at the same time as the oil from the seeds, or if the solvent extracted component were otherwise the primary component or compound of interest. Extending this further, if there was another compound or component to be obtained from the harvested plant material which had been separated from the tobacco seeds and, for example, if that compound only took 7 days in total to recover, there are effectively 3 different downstream processing periods which could be used to determine the appropriate planting time 8 for the crop 3. Specifically, the first compound, namely the oil, can be recovered in 9 days; the second compound to be recovered from the spent seeds from the oil pressing process can be recovered in 4 additional days, or 13 days in total; and the other compound to be obtained from the harvested plant material separated from the seeds in advance of production of the oil can be produced in 7 days.

If all three compounds were required, then the longest downstream processing period, namely 13 days, would need to be used in the calculation of planting time 8 to ensure that all three compounds could be completed in time for the scheduled delivery time 2. However, if one of the other compounds, namely the oil or other product to be recovered from the harvested plant material, was the item of primary interest, those could be recovered in either 9 or 7 days respectively, and one of those downstream processing periods 12 could be chosen as the governing time for calculation of the planting time 8 if those components were the compounds of primary interest from the plant material in question.

Where multiple compounds are to be recovered from a particular lot of harvested plant material, the longest compound downstream processing period could be chosen for use in computation of the planting time 8 for the crop 3, if it were desired to have all multiple compounds completed at the scheduled delivery time 2, or alternatively if one particular compound was most important for production it could be produced more quickly than some of the other compounds, then the compound downstream processing period 12 for that particular component could be chosen as the governing time for use in computation of the planting time 2 for the crop 3, with the completion of the remaining compounds to take place and be completed in some point in time following the scheduled delivery time 2. This second approach might be used where the first compound to be produced in the quickest fashion was the one desired by the customer and where the additional compounds to be produced could be produced on a longer timeframe and inventoried for a short period by the producer for subsequent delivery to the same or another customer.

As compared to the embodiment of FIG. 3, the embodiment of FIG. 4 shows the selection of a governing downstream processing method and time period is shown at Step D-2.

The method of FIG. 4, then, is intended to firstly demonstrate the potential for downstream processing of multiple plant compounds from a single lot of harvested plant material 1, and FIG. 4 in its method demonstrates the selection of the downstream processing period 12 to be used for computation of the planting time 8 for the crop 3 in the environmentally controlled underground growth chamber 9 based either upon the longest downstream processing period for an compound if all of the compounds are required to be completed at the scheduled delivery time 2, or alternatively based upon a selected one of the downstream processing periods 12 for the multiple compounds to be recovered if an compound other than the one with the longest downstream processing time is first or most importantly required by the customer to be delivered by the scheduled delivery time 2.

One other factor which can be calculated into the downstream processing periods is transport or storage time which might be required for the harvested plant material 1 to be held, or moved from the growth chamber 9 to a remote extraction or downstream processing site, if the extraction or downstream processing of the plant compounds from the harvested plant material 1 is taking place at a site remote from the growth chamber 9 and its associated complex or if for some other reason the harvested plant material is to be stored for some time following its completion and in advance of downstream processing.

For example, if the harvested plant material 1 were required to be transported for 18 hours to another plant in advance of the extraction of the components or compounds desired therefrom, that 18 hours could be factored into the downstream processing period 12 for those one or more compounds and, again, still properly computed then into the scheduled delivery time 2 by virtue of the fact that the additional time would be subtracted from the scheduled delivery time 2 in terms of determining the appropriate planting time 8 for the crop 3 in the environmentally controlled underground growth chamber 9 for growth in accordance with a selected predetermined growth profile 4 to result in the timely and scheduled production of the plant compound(s) in question. It will be understood that any such type of added steps such as transport or the like which might be required to be conducted during the processing or downstream processing of compounds from the plant material in question can be allowed for in the scheduling of the production of the compound(s) in question from the harvested plant material 1 to be grown in the growth chamber 9, simply by adding that amount of time forecast to be required for such step to the downstream processing period 12, and/or conversely by subtracting that additional transport or processing time from the scheduled delivery time 2 when the planting time 8 for the crop 3 in the growth chamber 9 is being determined.

CONCLUSION

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for modeling a growth profile for a crop for use in the scheduled production of harvested plant material from which a plant compound can be recovered, said method comprising:
   providing a genetically-isolated underground growth chamber;
   growing a quantity of starting crop material of the crop in the growth chamber under at least one monitored and controlled growth condition until said crop is ready to be harvested, wherein said growth profile comprises:
   a. the type of starting crop material used;
   b. details of said at least one controlled growing condition such that said controlled growing conditions can be subsequently replicated; and
   c. the time required from planting the starting crop material to the harvest of the plant material therefrom, being the growth period.

2. The method of claim 1 wherein said at least one controlled growing condition is maintained in a static fashion throughout the growth period.

3. The method of claim 1 wherein said at least one controlled growing condition is selected from the group comprising:
   a. Growth medium in which the starting crop material will be planted;
   b. Lighting parameters for use within the growth chamber to provide the desired lighting profile for the crop being grown at the desired times;
   c. Temperature parameters for use within the growth chamber to provide the desired temperature profile for the crop being grown at the desired times;
   d. Humidity parameters for use within the growth chamber to provide the desired humidity profile for the crop being grown at the desired times;
   e. Irrigation parameters for use within the growth chamber to provide the desired irrigation profile for the crop being grown at the desired times;
   f. Air quality parameters for use within the growth chamber to provide the desired air contents for the crop being grown at the desired times;
   g. Fertilizer parameters for use within the growth chamber to provide desired amounts and types of fertilizer to the crop being grown at the desired times;
   h. Hydroponic growing parameters, where hydroponics plant growth techniques to be employed;
   i. Specific types of equipment to be used within the growth chamber at desired times during the growth of the crop.

4. The method of claim 1 wherein at least one controlled growing condition is modified during the growth period, and wherein the relative times at which such modifications take place are also a part of said growth profile.

5. The method of claim 1 wherein conditional logic is developed for the growth profile whereby at least one of the controlled growing conditions can be modified in a subsequent replication of the growth profile upon detection of the requisite conditions for such a modification.

6. The method of claim 1 wherein the yield of harvested plant material from a selected quantity of starting plant material is determined and contained within the growth profile such that a subsequent use of the growth profile could include a yield-based selection of the quantity of starting plant material.

* * * * *